March 10, 1936.　　　　J. RODACK　　　　2,033,448
PANEL FASTENER
Filed Nov. 15, 1932
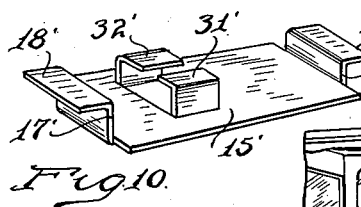
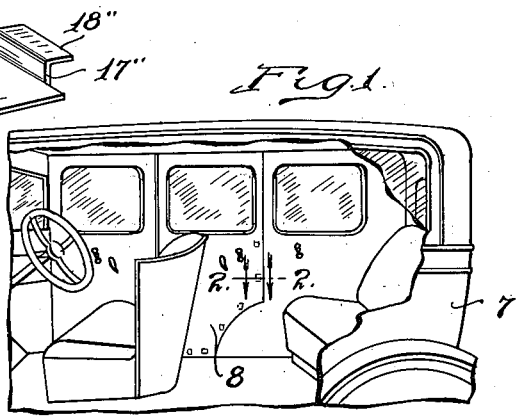
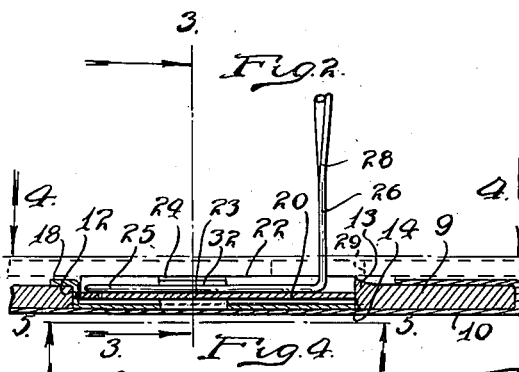
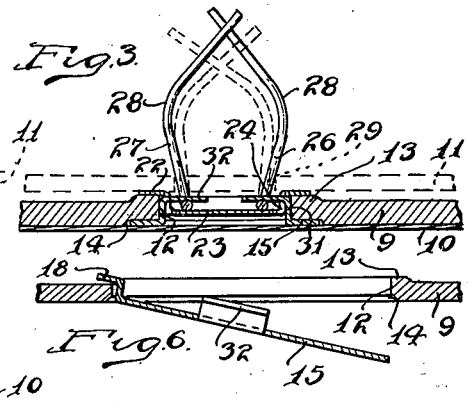
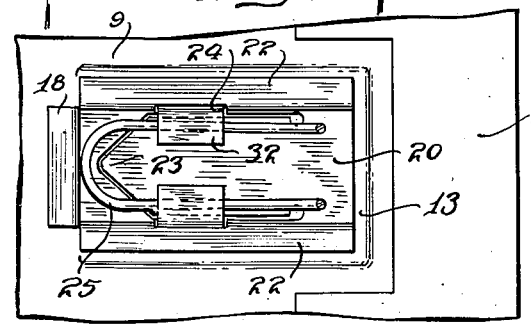
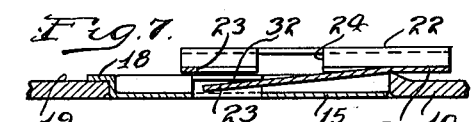
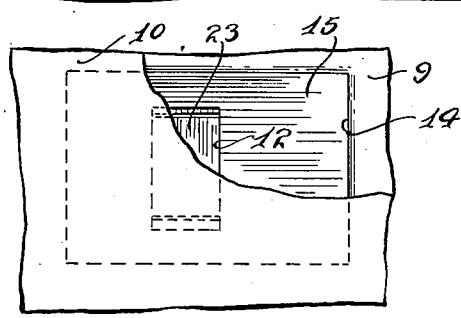
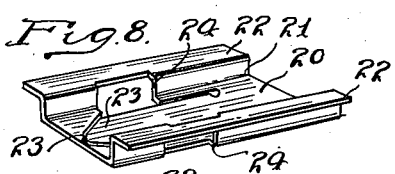
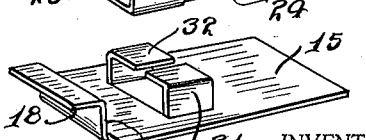
INVENTOR.
James Rodack
BY
HIS ATTORNEY.

Patented Mar. 10, 1936

2,033,448

UNITED STATES PATENT OFFICE 2,033,448

PANEL FASTENER

James Rodack, Detroit, Mich., assignor of one-third to Paul Zinser and two-thirds to Paul H. Travis Application November 15, 1932, Serial No. 642,772

3 Claims. (Cl. 24—208)

My invention relates to a new and useful improvement in a panel fastener adapted for use, generally, in fastening a panel to a supporting body, but particularly adapted for use in securing an upholstery bearing panel in position on its supporting body. This type of upholstering in which the upholstery is mounted on a panel supported on a suitable supporting structure is commonly used in upholstering automobiles.

It is an object of the present invention to provide a fastener of this class which will be simple in structure, durable, economical of manufacture, easily and quickly mounted in position, and easily and quickly secured in position after having been mounted on the panel.

It is another object of the invention to provide a fastener of this class which will permit the removal of the panel from and its replacement on the supporting structure without injuring or endangering either the upholstery or the panel itself.

It is another object of the invention to provide a fastener of this class so constructed and arranged that it will serve as a reinforcement of the panel or carrying body at the point at which mounted and which will also permit the use of thinner card board or panel while still maintaining the desired degree of stiffness and rigidity.

Another object of the invention is the provision of a fastener of this class which will serve as a means for securely fastening the panel in position on a supporting structure and which will be sufficiently flexible or loose to accommodate itself to variations in the location of the receiving openings formed in the supporting structure.

Another object of the invention is the provision of a fastener of this class which will, when mounted on a supporting panel, in no manner mar or interfere with the outer surface of the panel so that smooth, uninterrupted surface is afforded, and thus a superior job of upholstering is made possible.

It is another object of the invention to provide a fastener of the class described which will permit the embracement of the panel with its rear face closely against, and substantially engaging the supporting structure on which mounted.

Other objects will appear hereinafter.

Fig. 1 is a fragmentary side elevational view of a vehicle body with parts broken away showing the invention applied.

Fig. 2 is a longitudinal central sectional view of the invention showing it applied, taken on line 2—2 of Fig. 1.

Fig. 3 is a sectional view taken on line 3—3 of Fig. 2.

Fig. 4 is a view taken on line 4—4 of Fig. 2.

Fig. 5 is a view taken on line 5—5 of Fig. 2 with a part of the upholstery torn away.

Fig. 6 is a central sectional view of one part of the invention in the course of assembly.

Fig. 7 is a central sectional view of the invention with one part in its final position of assembly, and the other parts in process of assembly.

Fig. 8 is a perspective view of one of the retaining plates used in the invention.

Fig. 9 is a perspective view of the other retaining plate used in the invention.

Fig. 10 is a perspective view of a modified form of the invention.

In the drawing I have illustrated the vehicle body, 7, having a panel 8, which is attached to the frame of the body by means of the invention. These panels 8, generally comprise a supporting body 9, covered with a layer 10, of upholstery, and the panels are suitably secured to the supporting structure 11, by a suitable fastener.

The supporting body 9 is, in order to prepare the same for the reception of my fastener, provided with openings 12, in the proper locations. As shown in Fig. 5 these openings are preferably rectangular, and the three edges thereof are offset inwardly to the rear face to provide the inwardly projecting bead 13, with corresponding recesses 14, on the front side of the supporting body 9. The fastener comprises a retaining plate 15. Formed centrally of one edge is the tongue 17, having its terminal portion 18, angularly turned to extend parallel to the main body of the plate 15, the inner portion of this tongue extending at right angles to the plate 15. The face of the plate 15, from which the tongue 17 projects may be termed the inner face of this plate 15. Punched from the plate 15 and projecting inwardly from its inner face are the oppositely disposed L shaped lugs or hooks 31 and 32 which are directed inwardly toward each other. In assembly, the angularly turned end 18 of the tongue 17 is inserted into the opening 12 so as to engage the inner surface 19, of the supporting body 9, and the plate 15 is then rocked on this tongue until the other edges thereof lie in the recesses 14. These recesses 14 are of a depth corresponding to the thickness of the plate 15 so that when in this position, as shown in Fig. 7, the outer surface of the plate 15 lies flush with the outer surface of the supporting body 9.

A locking device is used with the invention for the purpose of locking the plate 15, in position and reinforcing the supporting body 9 and the opening 12. This locking plate 20, is provided at its opposite edges with flanges 21, which project outwardly from one face at right angles thereto and each of which is angularly turned intermediate its ends to provide the flange or lip 22 which lies parallel with the plane of the body 20. The tongue 23 is punched from the body 20. Intermediate the ends of the tongue 23, there are punched in the flanges 21 and 22 the openings 24. The plates 20 and 15 are preferably made from spring metal so that the tongue 23 is resilient.

After the plate 15 has been placed in the position shown in Fig. 7, the tongue 23 is flexed outwardly from the main body of the plate 20 and inserted beneath the lugs 31 and 32 as shown in Fig. 7. The plate 20 is then slid upwardly until the lugs 31 and 32 register with the openings 24, whereupon the plate 20, is slipped into the opening 12, with the flanges 22, engaging against the beads 13. Thus the plate 15 is securely locked in position and a reinforcement of the long edges of the opening 12 is provided.

A spring fastener is used with the device comprising the elongated U shaped stem 25, each leg of which is turned to extend at right angles to the main body in spaced relation to provide the locking prongs 26 and 27 which are bowed intermediate their ends as at 28, and which overlap at their free ends as shown in Fig. 3. This U shaped stem is inserted under the lugs 31 and 32 so as to lie in engagement therewith and with the faces of the plate 20 and the tongue 23. The width of this stem 25, is less than the space between the members 31 and 32 so that a lateral movement of the stem, 25, is possible as shown in dotted lines in Fig. 3. This permits a shifting of the locking prongs laterally so that should the openings 12, in the supporting body 9 not be provided in proper registration with the openings 29 formed in the supporting structure 11, a shifting of the locking prongs to the proper place may be effected. After the stem 25 has been placed in position the panel, embodying the supporting structure 9 with the upholstery 10 mounted thereon, is placed against the supporting structure 11, and the locking prongs 26 and 27 are thrust inwardly through the openings 29, formed in the supporting structure 11. These locking prongs 26 and 27 will move into the dotted line position shown in Fig. 3 when thrust through an opening in the supporting structure so that the prongs will be engaged, when the device is moved to final position, by the supporting structure behind the bow 28. Thus the panel is held by means of a snap or spring fastener securely in position on the supporting structure 11, with the supporting body 9 lying closely to the supporting structure 11, and with the outer face of the supporting body 9, provided with a smooth surface. At the same time the panel may be easily and quickly detached from the supporting structure 11, without endangering or mutilating the panel on account of the reinforcement of the openings 12.

It will be noted that the plate 15 overlies the edges of the opening 12, and thus the marginal edges of the plate 15 cooperate with the marginal edges of the flanges 22, of the plate 20, to provide reinforcement on opposite sides of the supporting body 9, at opposite sides of the opening 12. It will be noted that the depth of the flanges 21 is not so great as the depth of the tongue 17 so that the plate 20 does not engage the plate 15 but is always in spaced relation thereto. This permits the various parts being placed under tension when the portion 25 is inserted into position between the lugs 31 and 32 and the plate 20.

In the form shown in Fig. 10, I have provided a plate 15' having the locking lugs or hooks 31' and 32' punched therefrom. In one end of the plate 15' is the tongue 17' with the angularly prime portion 18'. In the opposite end of the plate is a similar tongue 17" with the angularly terminal portion 18". With this construction, the portion 18' may be inserted into the opening as shown in Figure 6 and the plate 15' then flexed so that the tongue 18" may be inserted into the opening whereupon the resiliency of the plate 15' will cause the same to move into straightened position with the portions 18' and 18" engaging one face of the panel at the end edges of the opening and the plate 15' overlying the other edges of the opening and engaging the opposite side of the panel. With this form the locking plate shown in Fig. 8 is dispensed with and a more economical structure provided. Since the major thrust on the plate 15' will be inwardly of the panel and since the plate engages the outer surface of the panel, the form shown in Fig. 10 will be sufficiently strong for all ordinary purposes.

With a fastener constructed in this manner, the advantages enumerated are present and a device is afforded which may be very easily and quickly mounted in position on the supporting body and which permits a quick, secure, and easy mounting of the panel on the supporting structure.

While I have illustrated and described the preferred form of construction, I do not wish to limit myself to the precise details of structure shown, but desire to avail myself of such variations and modifications as come within the scope of the appended claims.

Having thus described my invention, what I claim as new and desire to secure by Letters Patent is:

1. A fastener of the class described, adapted for use with a supporting body having an opening formed therein, comprising a retaining plate adapted for overlying said opening and engaging one face of said body; means on said plate for engaging the opposite face of said body; a locking plate adapted for overlying said opening and engaging the opposite face of said body; means on said locking plate lying within the marginal limits of said opening for engaging said retaining plate within the marginal limits of said opening for locking said retaining plate in position on said body.

2. A fastener of the class described adapted for use with a supporting body having an opening formed therein comprising: a retaining plate adapted for overlying said opening and engaging one face of said body; means on said plate for engaging the opposite face of said body; a locking plate adapted for overlying said opening and engaging the opposite face of said body; a hook forming member on said retaining plate; means on said locking plate for engaging said hook forming member and locking said plates in fixed relation to said body.

3. In combination a fastener of the class described adapted for attachment to a supporting body having an opening formed therein, comprising a retaining plate adapted for overlying said opening and engaging one face of said body; means on said plate for engaging the opposite face of said body; a locking plate adapted for overlying said opening and engaging the opposite face of said body; a hook forming member on said retaining plate; means on said locking plate for engaging said hook forming member and locking said plate in fixed relation, and a separable fastener engaging said hook forming member.

JAMES RODACK.